Patent [19] … 3,813,861
Wood … June 4, 1974

[54] MOBILE STACK-FORMING IMPLEMENT

[75] Inventor: William Robert Wood, Ankeny, Iowa

[73] Assignee: Deere & Company, Moline, Ill.

[22] Filed: Mar. 26, 1973

[21] Appl. No.: 344,712

[52] U.S. Cl. .................................. 56/344, 56/346
[51] Int. Cl. ........................................ A01d 87/10
[58] Field of Search ............ 56/341, 344, 346, 350, 56/351

[56] References Cited
UNITED STATES PATENTS
3,356,327  1/1971  Garrison ........................... 56/341 X
3,732,672  5/1973  Adee et al. ........................ 56/344 X Primary Examiner—Antonio F. Guida
Assistant Examiner—J. N. Eskovitz

[57] ABSTRACT

A stack-forming implement including a mobile frame, a container on the frame, a crop pickup unit on the frame forwardly of the container operative to pick crop material up off the ground and discharge it upwardly and rearwardly into the container, a top for the container reciprocable vertically between raised and lowered positions for compressing the crop material in the container, the front end of the top having a deflector member mounted thereon for vertical pivotal movement between a raised deflecting position and a lowered compressing position, and means for selectively maintaining the deflector in either its raised or lowered position as the top is lowered to compress the crop material in the container, the deflector in the former position being operative to deflect crop material being discharged rearwardly into the container downwardly into the front portion thereof while the material in the rear portion of the container is being compressed by the top, and the deflector in the latter position being operative to compress the material in the front portion of the container simultaneously as the material in the rear portion of the container is being compressed by the top.

10 Claims, 8 Drawing Figures

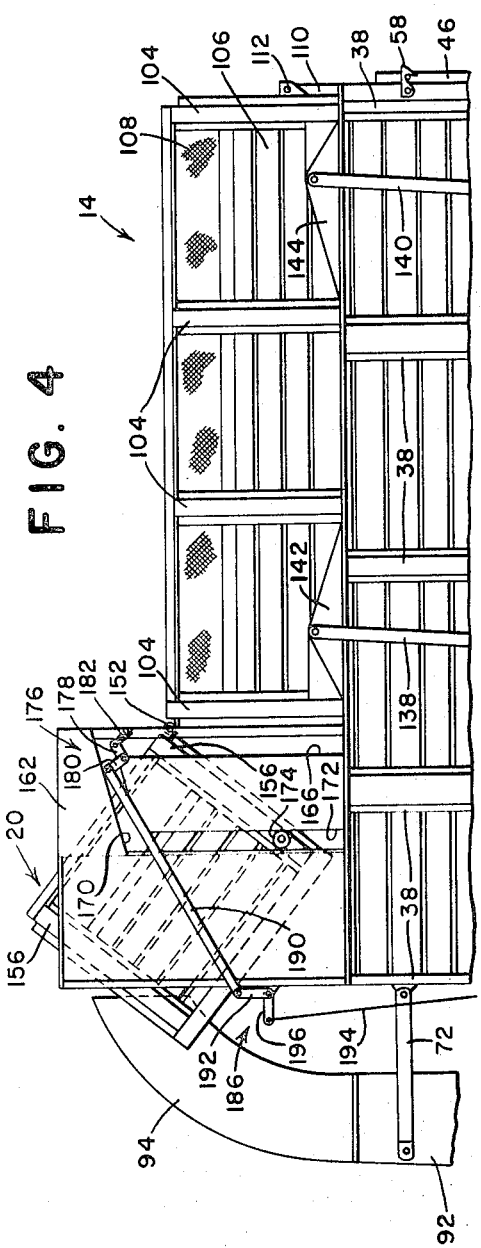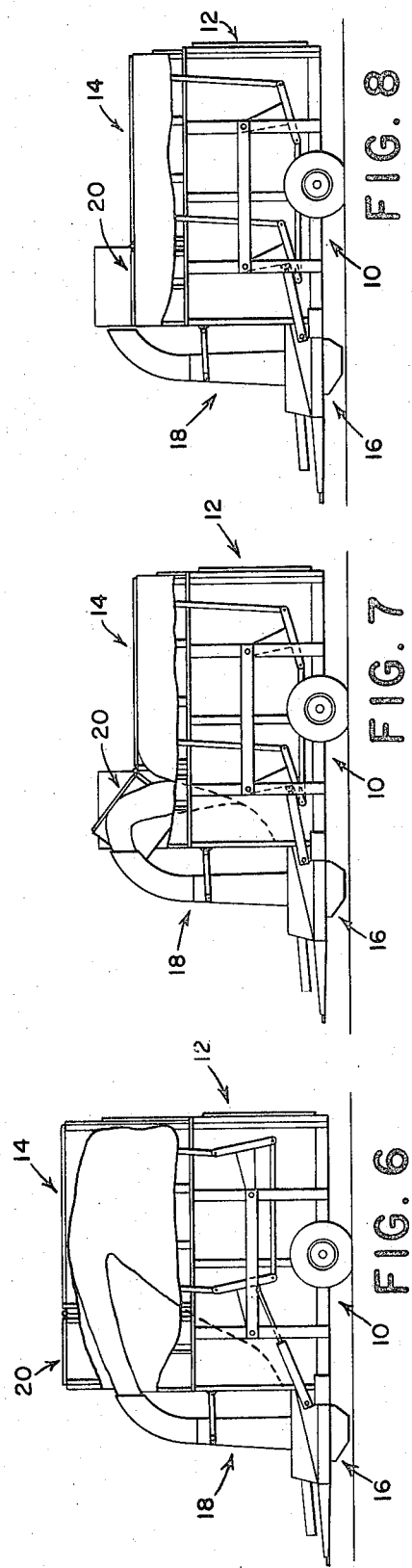

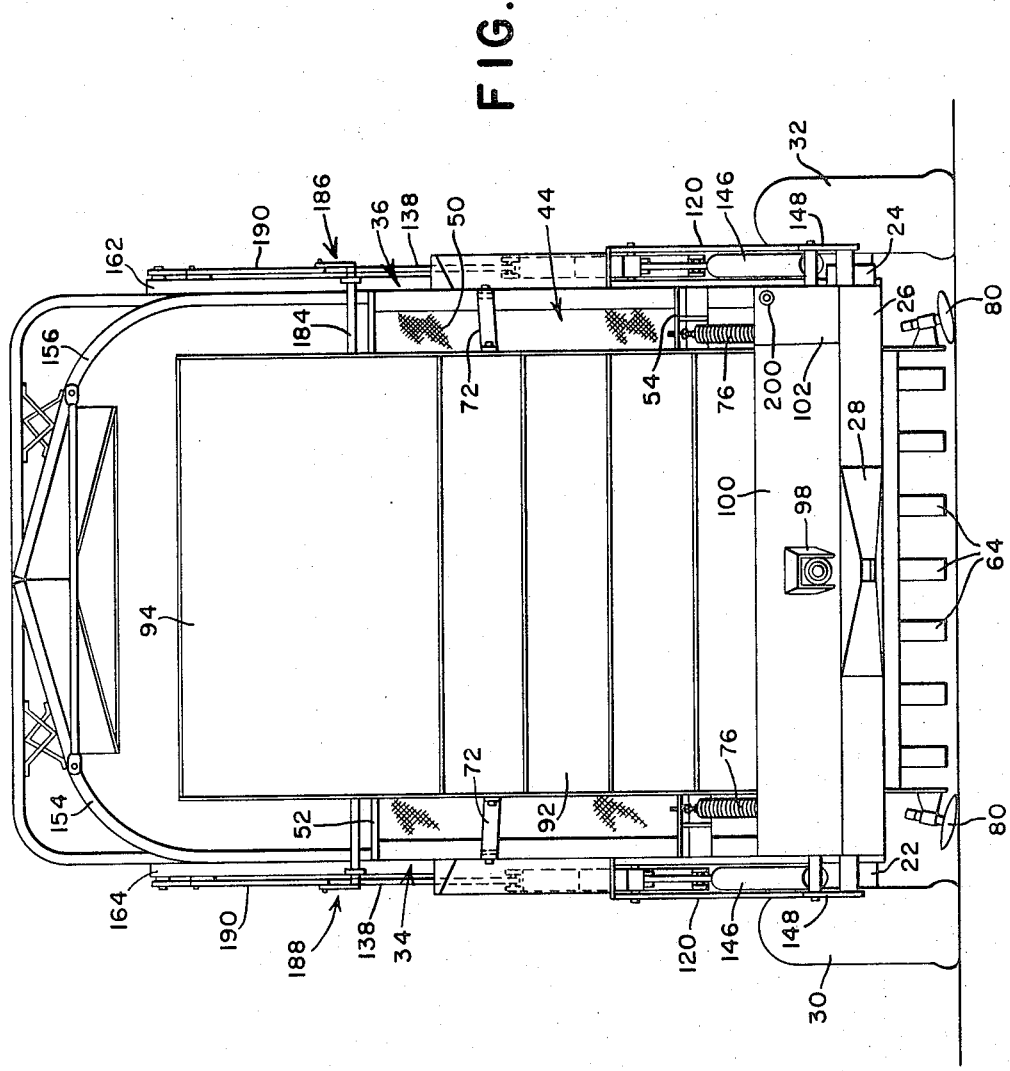

MOBILE STACK-FORMING IMPLEMENT

BACKGROUND OF THE INVENTION

The present invention relates generally to stack-forming equipment and more particularly to a mobile stack-forming implement having a vertically reciprocable compressor, the compressor including means permitting continuous operation of the stack-forming process during the compression cycle.

Stack-forming wagons having a crop container and a pickup and blower unit for picking crop material up off the ground and discharging it forcefully into the container to form a compressed stack of material are well known in the prior art. It is also known to provide a vertically reciprocable roof for the container to assist in compressing the crop in the container. In devices of the latter type, the roof moves through a compression cycle from its normal position above the crop discharge opening to a position below the opening, and it is therefore necessary to interrupt the flow of crop material into the container for the duration of the compression cycle. Since the crop in the container must be compressed periodically as it fills the container, it will be appreciated that a substantial time delay is incurred as a result of the interruptions necessitated for the compression cycles.

SUMMARY OF THE INVENTION

Accordingly, it is a primary object of the present invention to provide a stack-forming implement having means permitting an uninterrupted flow of crop material into the container during the compression cycle.

It is a further object to provide such an implement having the capability of producing a stack comparable in quality to those produced by existing stack-forming implements.

It is yet a further object to provide such an implement characterized by its economical construction and its reliability, simplicity, and ease of operation.

In pursuance of these and other objects, the stack-forming implement of the invention comprises, generally, a mobile frame having a material container thereon, a material pickup and delivery unit on the frame forwardly of the container, the unit being operative to pick material up off the ground and discharge it rearwardly into the container, and a roof mounted on the container for vertical reciprocable movement through a compression cycle from a normally raised position above the material discharge opening to a lowered position below the discharge opening, the roof having a deflector member pivotally mounted on its forward end and movable between a generally horizontal compressing position and an upwardly and forwardly extending deflecting position.

Means are provided on the container to selectively maintain the deflector member in either its compressing or its deflecting position when the roof is lowered to compress the crop in the container. When disposed in its deflecting position, the forward end of the member extends above the material discharge opening when the roof is in its lowered position, and is thus operative to deflect material being discharged through the opening downwardly into the forward end of the container during the compression cycle. The material in the remainder of the container can thus be compressed without interrupting the flow of material into the container. During the final compression cycle, the deflector is maintained in its compressing position to compress material in the forward portion of the container. It will thus be appreciated that the flow of material into the container need be stopped during the stack-forming process only during the final compression cycle of the roof.

BRIEF DESCRIPTION OF THE DRAWINGS

The preferred embodiment of the present invention will be described in conjunction with the accompanying drawings in which:

FIG. 4 is a fragmentary view similar to FIG. 3, but with the deflector member shown in its deflecting position;

FIG. 5 is a front elevational view of the implement; and

FIGS. 6–8 are reduced scale, left side elevational views of the implement illustrating the sequence of operation of the roof and deflector member.

DESCRIPTION OF THE PREFERRED EMBODIMENT

Figure 1:
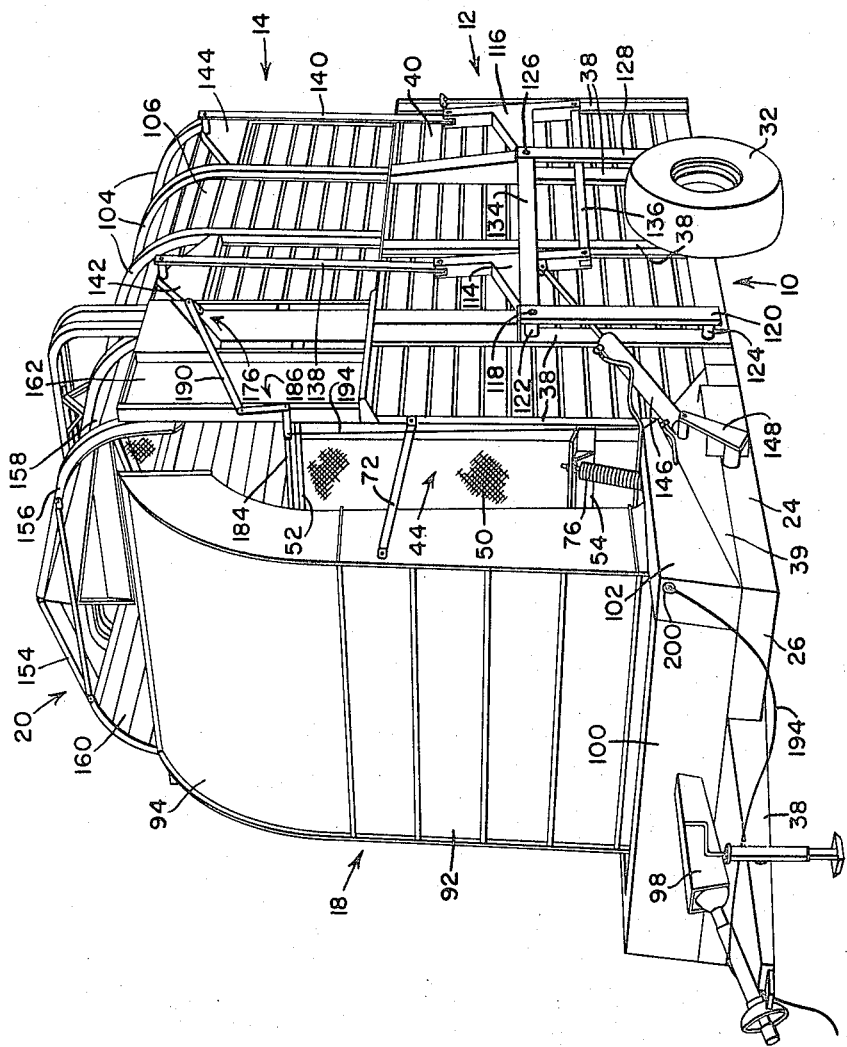
FIG. 1 is a perspective view of the stack-forming implement of the invention as seen from the left front.

Referring to the drawings in greater detail, the stack-forming implement of the invention comprises, generally, a mobile frame 10 adapted to be towed by a tractor, a material container 12 carried by the frame, a top 14 for the container 12 mounted on the latter for vertical reciprocable movement, the top being operative to compress material in the container, a material pickup and propelling unit 16 mounted on the frame forwardly of the container 12 and operative to pick material such as windrowed hay or corn stover up off the ground and propel the same upwardly, a material delivery spout 18 for directing the material from the pickup unit rearwardly into the container 12, and a deflector member 20 pivotally connected to the forward end of the top 14.

The frame 10 includes a pair of longitudinally extending, transversely spaced beams 22 and 24 on the right and left sides, respectively, of the implement, and a transverse beam 26 connecting the extreme forward ends of the longitudinal beams 22 and 24. A triangular hitch structure 28 is fixed centrally to the transverse beam 26 and extends forwardly therefrom, the structure being adapted at its forward end for attachment to the drawbar of a conventional agricultural tractor. A pair of ground-engaging wheels 30 and 32 are rotatably mounted on the midportions of the longitudinal beams 22 and 24, respectively, to support the frame relative to the ground.

The container 12 is formed in part by a pair of vertically extending walls 34 and 36 on the right and left sides, respectively, of the implement. Since the implement is generally symmetrical about its longitudinal center line, a description of those elements on the left side of the machine will be analogously applicable to the corresponding elements on the right side thereof. The left wall 36 of the container 12 includes a plurality of vertical support members 38 fixed at their lower ends to the longitudinal beam 24, and a rectangular sheet metal section 40 secured to the upper side of the beam 24 and the inner sides of the supports 38. A triangular reinforcing plate 39 is fixed along adjoining edges to the forwardmost vertical support member 38 and the longitudinal beam 24. The container 12 further includes a horizontal floor 42 which extends transversely between the longitudinal beams 22 and 24, a front wall 44 which encloses the forward ends of the sides 34 and 36 and bottom 42, and a rear wall 46 which encloses the rear ends of the sides and bottom. A conveyor 48 is movable rearwardly along the top surface of the floor 42 to remove the finished stack from the container 12. The front wall 44 comprises a heavy gauge rectangular screen 50 supported by a pair of upper and lower structural members 52 and 54, respectively, which extend transversely between and interconnect the forwardmost vertical support members on the walls 34 and 36. The rear wall 46 is pivotally connected at 56 to the container floor for vertical pivotal movement between the raised position shown in the drawings and a lowered position in which the outer end rests on the ground and the wall acts as a ramp for unloading the completed stack from the container. A releasable latch member 58 maintains the wall 46 in its raised position during the stack-forming process.

The crop pickup unit 16 is suspended on the frame for limited vertical movement through the rectangular opening defined by the longitudinal beams 22 and 24, the transverse beam 26, and the front wall 44 of the container. The unit includes a housing 60 which is formed integrally with and at the lower end of the spout 18, a transverse shaft 62 supported at opposite ends in the sidewalls of the housing 60, and a plurality of crop pickup and propelling paddles 64 pivotally supported on the shaft 62. The lower end of the pickup unit and spout combination are supported on the implement by a pair fore-and-aft extending lower arms 66 which are pivoted at their forward ends to each side of the housing 60 and are fixed at their rear ends to opposite sides of a transverse shaft 68 which is rotatably supported in brackets 70 on the front wall 44 of the container 12. Supporting the upper end of the container is a second pair of fore-and-aft extending arms 72 which are pivoted at their forward ends to the sides of the spout 18 and at their rear ends to brackets 74 fixed to the front wall 44.

A major portion of the weight of the pickup unit and spout is supported from the front wall of the container by a pair of springs 76 which extend between brackets 78 on the forward ends of the lower arms 66 and points on opposite sides of the transverse structural member 54. The upper anchors for the springs 76 include threaded rod and nut adjustment members for adjusting the amount of force exerted by the springs. In operation, that portion of the weight of the pickup unit which is not supported by the springs 76 is supported on the ground by a pair of ground-engaging concave disks 80, one of which is mounted on each side of the housing 60. The suspension mechanism for the pickup unit permits the unit to move vertically relative to the frame to conform to variations in the surface of the ground.

Figure 3:
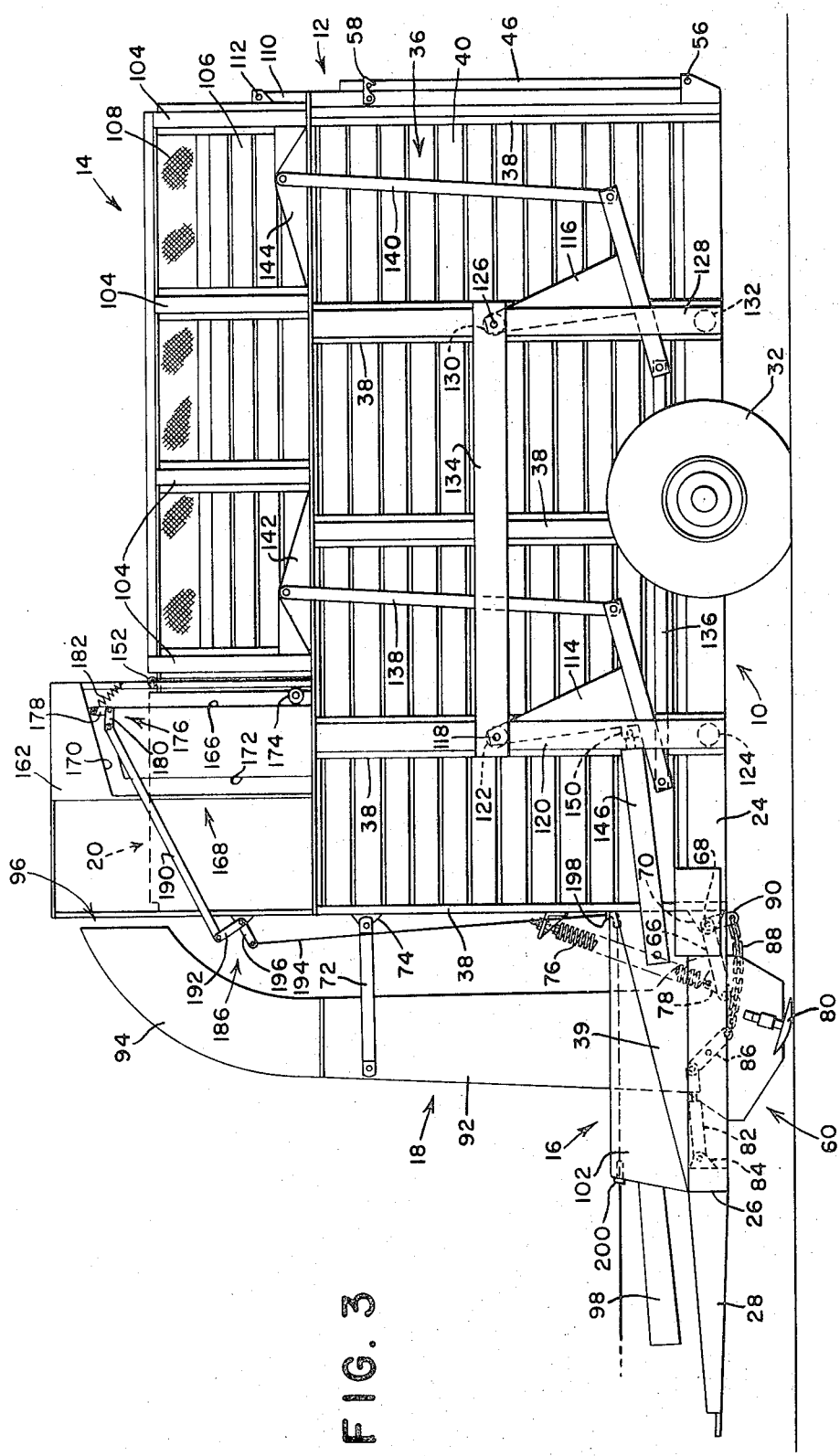
FIG. 3 is a view similar to FIG. 2, but with the roof in its lowered position.

The unit can be raised relative to the frame for transport purposes by means of a small hydraulic cylinder 82 which acts between a bracket 84 on the rear side of the transverse beam 26 and one end of an arm 86 pivotally mounted at its midpoint on the inner side of the longitudinal beam 24. A chain 88 connects the other end of the arm 86 with an arm 90 fixed to the transverse shaft 68. In its operating position, as shown in FIG. 3, the cylinder 82 is retracted to slacken the chain 88 and thereby permit the unit 16 to move relative to the frame to follow variations in the ground surface. For transport purposes, the cylinder 82 is extended, which causes the chain 88 to tighten and pull forwardly on the arm 90, thereby moving the arms 66 upwardly and raising the unit 16 up off the ground.

The spout 18 has a generally vertical lower portion 92 communicating at its lower end with a pickup unit housing 60, and an arcuate upper portion 94 terminating in a rearwardly directed discharge opening 96. In operation, the pickup unit shaft 62 is driven in a clockwise direction as viewed in FIG. 2, causing the paddles 64 to extend radially outwardly from the center of the shaft and define the cylinder shown in dotted lines in FIG. 2. The shaft is driven from the power take-off on the tractor used for towing the implement, through conventional drive means enclosed by sheet metal shields 98, 100 and 102. As the paddles rotate in the manner described, they engage crop material lying on the ground, such as windrowed alfalfa or the like, and propel it upwardly through the spout 18. The curved leading wall of the spout portion 94 directs the material rearwardly through the discharge opening 96 and into the container 12.

The container top 14 has an inverted U-shaped configuration and comprises a plurality of right and left pairs of curved support members 104 which extend upwardly in parallel relation to the walls 34 and 36 of the container 12 and curve inwardly toward the center of the implement. Corresponding right and left pairs of the members 104 are joined along the center line of the implement to form the framework of the top 14. A sheet metal panel 106 is secured to the inner sides of the members 104, and a section of heavy gauge screen 108 extends between the upper edges of the right and left panels 106 and is similarly secured to the inner sides of the members 104. The top 14 further includes a rear wall 110 which is pivoted along its upper edge at 112 and is swingable between its lowered position shown in the drawings and a generally horizontal position to permit removal of the completed stack from the container 12. As is apparent from the drawings, the sidewalls of the top are disposed just inwardly of the sidewalls of the container, and the rear wall of the top is disposed just inwardly of the rear wall of the container, so that the top is free to move vertically relative to the container between a raised position shown in FIG. 2 and a lowered position shown in FIG. 3.

Figure 2:
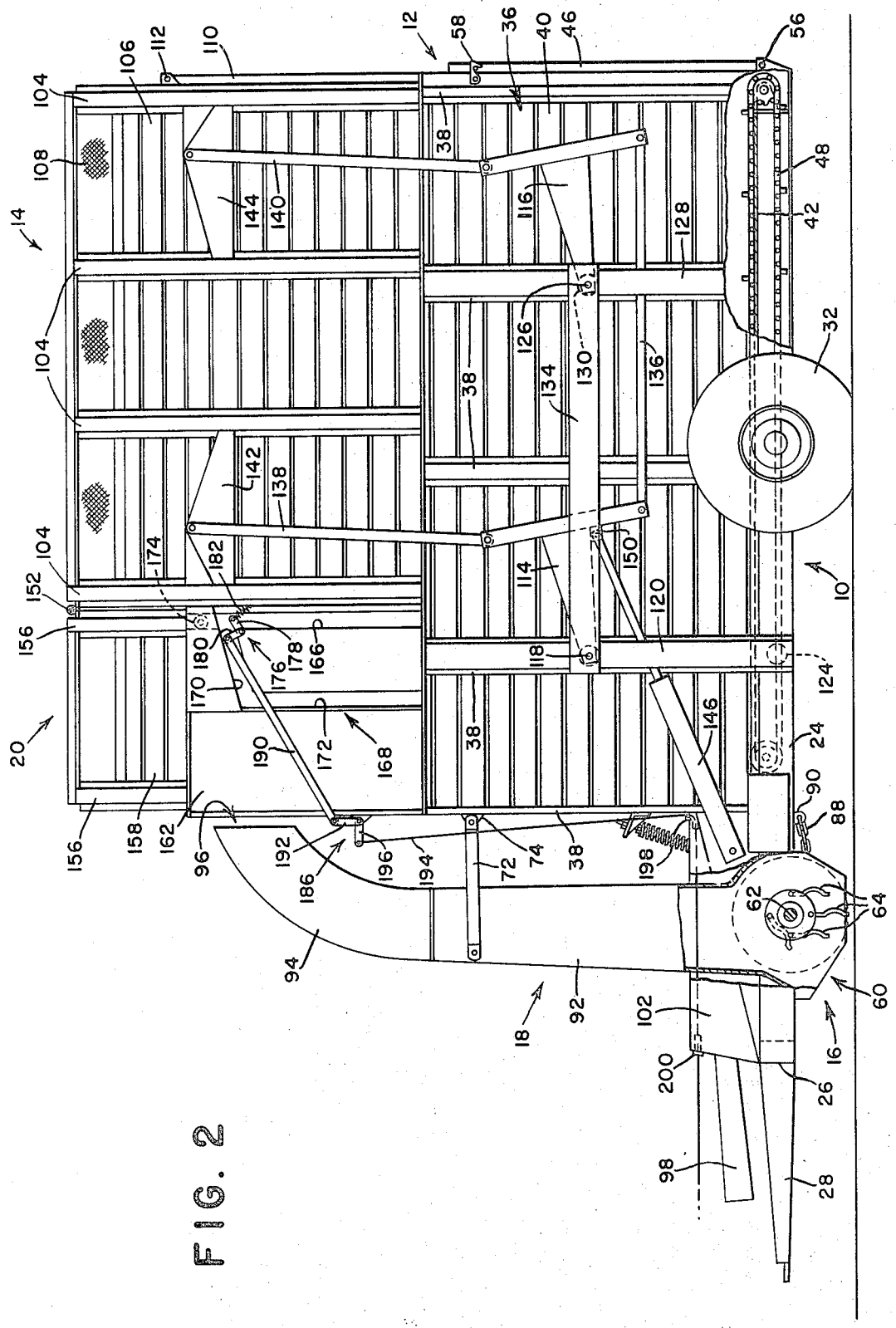
FIG. 2 is a left side elevational view of the implement, with the roof in its raised position and the deflector member in its compressing position.

Mechanism connecting the top to the container and operative to move the top relative to the container between its raised and lowered positions is provided on each side of the implement. Since the mechanism on the right side is a mirror image of that on the left side, only the latter need be described. The mechanism includes a pair of fore-and-aft, T-shaped bell crank members 114 and 116, respectively, pivotally mounted on the sidewall 36 at longitudinally spaced points thereon. The front bell crank 114 is pivoted on a pin 118 which extends transversely between one of the vertical supports 38 and a vertical bar 120 which is disposed outwardly from and in spaced relation to the support by means of upper and lower spacers 122 and 124, respectively. Similarly, the rear bell crank 116 is pivoted on a pin 126 which extends transversely between another of the vertical supports 38 and a vertical bar 128 which is disposed outwardly from and in spaced relation to the support by means of upper and lower spacers 130 and 132, respectively. A support 134 extends longitudinally between the upper ends of the vertical bars 120 and 128, in spaced relation to the wall 36. A horizontal link 136 interconnects the lower ends of each of the bell cranks and acts to maintain the bell cranks in parallel relation at all times. A pair of fore-and-aft vertical links 138 and 140, respectively, connect the upper ends of the bell cranks 114 and 116, respectively, with fore-and-aft brackets 142 and 144, respectively, on the side of the top 14. Each of the brackets 142 and 144 is generally triangular in shape and is fixed between an adjacent pair of support members 104. Completing the mechanism is a hydraulic cylinder 146 which extends between the vertical bar 120 and its adjacent vertical support member 38, and connects a bracket 148 fixed to the triangular reinforcing plate 39 and a bracket 150 on the front bell crank member 114. The cylinder is connectable through means not shown with the hydraulic system on the tractor used to tow the implement and is extensible and retractable to pivot the front bell crank 114 about the pin 118 between alternate positions shown in FIGS. 2 and 3. Movement of the front bell crank 114 is transferred to the rear bell crank 116 by the horizontal link 136, and pivotal movement of the bell crank is translated to vertical movement of the top by means of the vertical links 138 and 140. As will be apparent from the drawings, when the cylinder 146 is retracted, as shown in FIG. 3, the top 14 is in its lowered position, and when the cylinder is extended, as shown in FIGS. 1 and 2, the top is in its raised position.

The deflector member 20 is pivotally connected at 152 to the forward end of the top 14, the member being vertically swingable about the pivot 152 between a lowered or compressing position (shown in FIG. 3) in which it overlies the forward portion of the container 12 and forms a horizontal continuation of the top 14, and a raised or deflecting position (shown in FIG. 4) in which it extends upwardly and forwardly from the forward end of the top. The deflector member 20 is constructed of longitudinally spaced, right and left pairs of curved support members 154 and 156 each having a shape identical to the curved upper portions of the top support members 104, and sheet metal panels 158 and 160 which extend between the members 154 and 156, respectively, and are secured to the undersides thereof. The pivot 152 is formed by a transverse pin on the deflector rear support members 154 and 156 which is received in a bracket on the top forwardmost support members 104.

Referring to FIG. 4, it will be seen that when in its lowered position, the top 14 is disposed below the major portion of the discharge opening 96 and the spout 18. The deflector member 20, however, when raised to its deflecting position, extends upwardly and forwardly from the top to a point above the discharge opening. As shown somewhat schematically in FIG. 7, the deflector member is thus operative to deflect crop material downwardly into the forward end of the container while the material in the remainder of the container is compressed by the top 14. Since the material discharged into the container initially accumulates in the rear portion thereof, as shown in FIG. 6, a void is created in the forward end of the container for receiving the material deflected downwardly by the member 20. On the final compression cycle, as shown in FIG. 8, the deflector member is lowered to its compressing position to compress the material in the forward end of the container. The flow of material into the container thus need be interrupted only during the last compression cycle of the stack-forming process.

The deflector member 20 is selectively maintained in either its raised deflecting position or its lowered compressing position as the top is lowered by apparatus which will now be described. Mounted on the upper edge of the forward portion of the left wall 36 and extending upwardly therefrom is a wall structure 162 which forms a vertical continuation of the forward portion of the left wall 36. A second wall structure 164, which is a mirror image of the wall structure 162, is mounted on the upper edge of the forward portion of the right container wall 34 directly across from the structure 162. The following description of the structure 162 is analogously applicable to the structure 164. The structure 162 defines a first cam track 166 which extends vertically along the rear edge of the structure and a second cam track 168 including an upper portion 170 which communicates with and extends downwardly and forwardly from the upper end of the first cam track 166, and a lower portion 172 which extends vertically downwardly from the forward end of the portion 170. Mounted on the lower rear corner of each side of the deflector member 20 and disposed to ride in the cam tracks defined by the structures 162 and 164 is a cylindrical roller 174. When the top is in its raised position as shown in FIG. 2, the roller 174 is disposed in the extreme upper end of the vertical cam track 166. As the top is lowered, the roller 174 can either remain in the track 166, in which case the deflector 20 will be maintained in its lowered, compressing position as shown in FIG. 3, or the roller can follow the cam track 168, in which case the deflector 20 will assume its raised deflecting position as shown in FIG. 4.

The cam track which the roller 174 follows, and thus the position assumed by the deflector member 20, is controlled by a guide 176 pivotally mounted on the structure 162 at the juncture of the cam track 166 and the upper portion 170 of the cam track 168. An identical guide is mounted on the structure 164 on the right side of the machine. The guide 176 is shaped in the form of a bell crank and comprises a first, roller-engaging arm 178, and a second, control arm 180. The guide 176 is pivotally mounted on the structure 162 for movement between a first position (shown in FIG. 2) in which it is operative to guide the roller 174 forwardly into the upper portion 170 of the second cam track 168, and a second position (shown in FIG. 3) in which it is operative to maintain the roller in the vertical cam track 166. A spring 182 acts between the outer end of the arm 178 and the structure 162 to bias the guide toward the position shown in FIG. 2.

Control means are provided for selectively moving the guide manually to its second position shown in FIG. 3 against the biasing force of the spring 182. The control means include a shaft 184 rotatably supported on and extending transversely across the front wall 44 of the container 12. A bell crank 186 is fixed to the left end of the shaft 184 and is pivotal therewith about the axis of the shaft. A second bell crank 188 is fixed to the right side of the shaft 184. A link 190 connects one arm 192 of the bell crank 186 with the arm 180 of the guide 176, and a control cable 194 is connected to the other arm 196 of the bell crank. A link identical to the link 190 connects the bell crank on the right end of the shaft 184 with one arm of the guide on the left structure 164. As shown best in FIG. 2, the cable 194 extends downwardly from the arm 196 through a 90° guide 198 in the upper wall of the drive shield 102, thence forwardly beneath the shield and outwardly through a guide 200 in the front wall of the shield 102. The forward end of the cable (not shown) extends generally to the vicinity of the operator's platform on the tractor and may be pulled by the operator to rotate the shaft 184 and thereby move the bell crank guide members on both sides of the implement from the position shown in FIG. 2 to the position shown in FIG. 3.

The operation of the stack-forming implement of the invention will now be described. Initially, the operator raises the top 14 to the position shown in FIG. 2, engages the drive to the pickup unit 16, lowers the unit into its operating position, and pulls the implement along a swath or windrow of crop material. The crop material is blown rearwardly into the container 12 and begins filling the latter from back to front as shown in FIG. 6. When the level of material reaches the top of the container, the top is lowered by the operator and the guide 176 is permitted to remain in the position shown in FIGS. 2 and 4, the guide thus being operative to cause the deflector 20 to assume its deflecting position shown in FIG. 4 when the top reaches its lowered position. The operator continues to pull the implement along the windrow during the compression cycle and the crop discharged into the container is deflected downwardly into the lowered portion thereof as shown in FIG. 7. It is necessary to repeat this compression cycle several times during the stack-forming process. It will be apparent from FIG. 4 of the drawings that the structure 162 closes off the opening created between the rear edge of the deflector 20 and the front edge of the top 14 when the former is in its raised position and the latter is in its lowered position, and is thus operative to prevent crop material from being discharged transversely outwardly through the opening.

On the last compression cycle, the operator pulls on the cable 194 and holds it before the top is lowered, thereby pivoting the guide 176 to the position shown in FIG. 3 and causing the deflector to remain in its lowered, compressing position as the top is lowered. The crop material in the forward portion of the container is thus compressed during the last compression cycle by the deflector member as shown in FIG. 8. Following the last compression cycle, the top is raised, the rear doors 46 and 110 are opened, and the floor conveyor is actuated to remove the stack rearwardly from the container.

I claim:

1. A stack-forming machine comprising: a mobile frame; a material container on the frame including a bottom, a pair of transversely spaced, vertically extending sides, and front and rear walls enclosing the front and rear ends, respectively, of the bottom and sides; a vertically extending material delivery spout disposed forwardly of the front wall of the container and having a rearwardly directed discharge opening disposed above said front wall; material pickup and propelling means mounted on the frame forwardly of the container and beneath the spout for picking material up off the ground and propelling it upwardly through the spout, the spout being operative to direct the material rearwardly into the container; a top for the container having a crop-engaging portion and supported on the container for vertical movement between a raised position wherein the uppermost extent of the crop-engaging portion is disposed above the discharge opening in the spout and a lowered position wherein the uppermost extent of the crop-engaging portion is disposed below at least a portion of said discharge opening; a deflector member disposed above the front portion of the container and connected at its rear end to the front end of the container top for vertical pivotal movement between a raised position wherein the member extends upwardly and forwardly from the front end of the top to a point above the uppermost extent of the crop-engaging portion of the top and above the uppermost extent of the discharge opening in the spout when the top is in its lowered position, and a lowered position wherein the member extends forwardly from the front end of the top to a point below at least a portion of the discharge opening in the spout when the top is in its lowered position; and means for selectively maintaining the deflector member in either its raised or lowered position when the top is in its lowered position.

2. The invention defined in claim 1 including means normally maintaining the deflector member in its lowered position when the container top is in its raised position, and including means selectively operative to either move the deflector member from its lowered position to its raised position in response to movement of the container top from its raised position to its lowered position, or to maintain the deflector member in its lowered position as the top is moved from its raised position to its lowered position.

3. The invention defined in claim 2 wherein said selectively operative means comprises structure on the container defining a pair of cam tracks; cam track follower means on the deflector operative to selectively follow either of said cam tracks as the top is moved from its raised to its lowered position; and a movable guide member on said structure selectively operative to guide the follower means into either of the cam tracks.

4. The invention defined in claim 3 wherein said structure extends upwardly from the forward end portion of at least one of the container sidewalls and defines a first, vertical cam track, and a second cam track adjoining the upper end of the first cam track and extending forwardly therefrom, wherein the cam track follower means on the deflector comprises a roller disposed vertically above the first cam track when the roof is in its raised position and the deflector is in its lowered position, and wherein the movable guide member is pivotally supported on the structure at the juncture of said first and second cam tracks for movement between a first position wherein it is operative to prevent the roller from entering the first cam track and to guide the roller forwardly into the second cam track, and a second position wherein it is operative to prevent the roller from entering the second cam track.

5. The invention defined in claim 4 including means connecting the guide member and the structure for biasing the guide member toward its first position.

6. The invention defined in claim 1 including a vertical wall member extending upwardly from the forward end portion of each of the container sidewalls and forming an integral extension thereof, said wall members being disposed on opposite sides of the deflector when the latter is in its raised position and the roof is in its lowered position and being operative to prevent material discharged from the spout from being deflected transversely outwardly from beneath the deflector.

7. The invention defined in claim 6 wherein at least one of said vertical wall members includes structure defining a pair of cam tracks, and including cam track follower means on the deflector operative to selectively follow either of said cam tracks as the top is moved from its raised to its lowered position, and a movable guide member on said structure selectively operative to guide the follower means into either of the cam tracks.

8. The invention defined in claim 7 wherein said structure defines a first, vertical cam track, and a second cam track adjoining the upper end of the first cam track and extending forwardly therefrom, wherein the cam track follower means on the deflector comprises a roller disposed vertically above the first cam track when the roof is in its raised position and the deflector is in its lowered position, and wherein the movable guide member is pivotally supported on the structure at the juncture of said first and second cam tracks for movement between a first position wherein it is operative to prevent the roller from entering the first cam track and to guide the roller forwardly into the second cam track, and a second position wherein it is operative to prevent the roller from entering the second cam track.

9. A stack-forming machine comprising: a mobile frame; a material container on the frame including a bottom, a pair of transversely spaced, vertically extending sides, and front and rear walls enclosing the front and rear ends, respectively, of the bottom and sides; a vertically extending material delivery spout disposed forwardly of the front wall of the container and having a rearwardly directed discharge opening disposed above said front wall; material pickup and propelling means mounted on the frame forwardly of the container and beneath the spout for picking material up off the ground and propelling it upwardly through the spout, the spout being operative to direct the material rearwardly into the container; a top for the container having a crop-engaging portion and supported on the container for vertical movement between a raised position wherein the uppermost extent of the crop-engaging portion is disposed above the discharge opening in the spout and a lowered position wherein the uppermost extent of the crop-engaging portion is disposed below at least a portion of said discharge opening; a deflector member disposed above the front portion of the container and connected at its rear end to the front end of the container top for vertical pivotal movement between a raised position wherein the member extends upwardly and forwardly from the front end of the top to a point above the uppermost extent of the crop-engaging portion of the top and above the uppermost extent of the discharge opening in the spout when the top is in its lowered position, and a lowered position wherein the member extends forwardly from the front end of the top to a point below at least a portion of the discharge opening in the spout when the top is in its lowered position; structure on the container defining a pair of cam tracks; cam track follower means on the deflector operative to selectively follow either of said cam tracks as the top is moved from its raised to its lowered position; and a movable guide member on said structure selectively operative to guide the follower means into either of the cam tracks, one of said cam tracks being configured to maintain the deflector in its lowered position as the top is moved from its raised to its lowered position, and the other of said cam tracks being configured to move the deflector from its lowered to its raised position as the top is moved from its raised to its lowered position.

10. A crop material stack-forming machine comprising: a mobile frame; a material container on the frame including a bottom, a pair of transversely spaced, vertically extending sides, and front and rear walls enclosing the front and rear ends, respectively, of the bottom and sides; a downwardly opening top for the rear portion of the container including a pair of transversely spaced, vertically extending sides and a horizontally extending portion joining the upper edges of the sides, said top being supported on the container for vertical movement between a raised crop-receiving position and a lowered crop-compressing position; means supported on the frame for picking crop material up off the ground and propelling the same into the container along a normal trajectory extending rearwardly solely beneath the forward edge of the horizontally extending portion of the top when the latter is in its raised position, the normal trajectory of the crop material extending above the forward edge of the horizontally extending portion of the top when the latter is in its lowered position; and a deflector member mounted on the forward end of the top and above the front portion of the container for vertical pivotal movement between a raised deflecting position wherein said deflector member extends upwardly and forwardly from the forward end of the top through the normal crop trajectory when the top is in its lowered position and is operative to deflect the crop downwardly into the front portion of the container, and a lowered compressing position wherein said deflector member extends forwardly from the forward edge of the horizontally extending portion of the top when the top is in its lowered position and is operative to compress the crop in the front portion of the container.

* * * * *